United States Patent
Fujii et al.

(10) Patent No.: US 6,905,005 B2
(45) Date of Patent: Jun. 14, 2005

(54) DOUBLE WRAP BRAKE BAND

(75) Inventors: Tamotsu Fujii, Hamamatsu (JP); Xiaoming Gu, Fukuroi (JP); Hideaki Takabayashi, Hamakita (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 10/357,440

(22) Filed: Feb. 4, 2003

(65) Prior Publication Data

US 2003/0146057 A1 Aug. 7, 2003

(51) Int. Cl.$^7$ ................................................. F16D 51/00
(52) U.S. Cl. .............................. 188/77 W; 188/250 B; 192/107 T
(58) Field of Search .......................... 188/77 W, 77 R, 188/83, 249, 257, 259, 250 B; 192/80, 107 T

(56) References Cited

U.S. PATENT DOCUMENTS

| 774,448 | A | * | 11/1904 | Norris | 188/77 W |
| 1,704,963 | A | * | 3/1929 | Brey | 188/259 |
| 1,847,389 | A | * | 3/1932 | Fawick | 192/75 |
| 4,049,103 | A | * | 9/1977 | Sessler | 192/105 CD |
| 5,680,921 | A | * | 10/1997 | Vierk et al. | 192/107 T |

FOREIGN PATENT DOCUMENTS

JP 6-84034 12/1994

* cited by examiner

Primary Examiner—Xuan Lan Nguyen
(74) Attorney, Agent, or Firm—Crowell & Moring LLP

(57) ABSTRACT

A double wrap brake band is provided for use with a rotating element such as a rotating drum in an automatic transmission or the like. The double wrap brake band is provided with a friction surface on an inner circumferential surface of a band portion wrapped substantially double. The friction surface is provided with an inclined part such that the friction surface becomes gradually closer to an associated outer circumferential surface of the rotating element in a rotating direction of the rotating element.

2 Claims, 4 Drawing Sheets

DOUBLE WRAP BRAKE BAND

FIELD OF THE INVENTION

This invention relates to a double wrap brake band for use with an automatic transmission.

DESCRIPTION OF THE BACKGROUND

One example of conventional double wrap brake band assemblies is shown in FIGS. 1 and 2. A double wrap brake band assembly 1 is provided with a rotating drum 11 and a double wrap brake band 2 arranged on an outer circumference of the rotating drum 11. The double wrap brake band 2 is provided with outside bands 4 and a middle band 3, on which a friction lining 5 is bonded such that the friction lining 5 is frictionally engageable with an outer circumferential surface of the rotating drum 11. The double wrap brake band 2 is also provided with a connecting bar portion 8 to which the outside bands 4 and middle band 3 are connected at one end portions thereof, respectively. The double wrap brake band 2 is further provided with an apply bracket. 6 secured to an end portion of the middle band 3, said end portion being opposite to the end portion connected to the connecting bar portion 8, and also with an anchor bracket 7 secured to end portions of said outside bands 4, said end portions being opposite to the end portions connected to the connecting bar portion 8. The double wrap brake band 2 is anchored at the anchor bracket 7 by an anchor pin 10 illustrated by two-dot chain lines in FIG. 1. Upon application of a load to the apply bracket 6 from an apply pin 9 depicted by two-dot chain lines in FIG. 1, the middle band 3 and outside bands 4 are caused to wrap the rotating drum 11 so that the rotating drum 11 is locked.

A wet-type multiplate clutch and its associated brake band, which are employed when effecting gear change in an automatic transmission, are required to have predetermined frictional characteristics. However, a double wrap brake band assembly has high self-engaging property, thereby making it difficult to control apply loads. It is necessary to apply small binding loads especially in a small torque capacity range. The double wrap bake band assembly is, however, accompanied with a response problem because its apply pin requires a long operating stroke. Moreover, the double wrap brake band assembly has a large torque capacity, thereby making it difficult to control its servo pressure and servo action. Occurrence of variations in servo pressure and servo action tends to develop problems in that the double wrap brake band assembly may not allow a rotating drum to slide to an extent as much as desired or on the contrary, may be brought into a state resembling complete binding and may hence cause a shift shock.

SUMMARY OF THE INVENTION

An object of the present invention is, therefore, to provide a double wrap brake band, which is allowed to adequately slide on an associated rotating drum such that excellent control can be easily performed on an apply load.

In one aspect of the present invention, there is thus provided a double wrap brake band for use with a rotating element, said double wrap brake band being provided with a friction surface on an inner circumferential surface of a band portion wrapped substantially double, wherein the friction surface is provided with an inclined part such that the friction surface becomes gradually closer to an associated outer circumferential surface of the rotating element in a rotating direction of the rotating element.

In another aspect of the present invention, there is also provided a double wrap brake band provided with a double wrap band portion, a friction lining bonded on an inner circumferential surface of the band portion, and brackets secured on opposite free end portions of the band portion, respectively, said double wrap band portion being composed of a middle band as long as substantially a single wrap and outside bands as long as substantially a single wrap secured together at proximal end portions thereof, and said double wrap brake band being frictionally engageable with a rotating element located on an inner side of the double wrap brake band, wherein the friction lining is provided with an inclined part a thickness of which becomes gradually greater in a rotating direction of the rotating element.

Preferably, the friction lining can be bonded in a form divided in plural pieces in a circumferential direction, and the inclined portion is formed with the thickness thereof gradually increasing from a leading end of each of the divided pieces of the friction lining relative to the rotational direction of the rotating element.

These double wrap brake bands according to the present invention allow their associated rotating elements, such as rotating drums, to adequately slide, so that excellent control can be easily performed on apply loads.

DETAILED DESCRIPTION OF THE PREFERRED EMBODIMENT

In a double wrap brake band, outside bands and a middle band, each of which is provided with plural pieces of a friction lining bonded with angular intervals on the band, are secured together at proximal end portions thereof, an apply bracket is secured on a free end portion of the middle band, and an anchor bracket is secured on free end portions of the outside bands. The pieces of friction lining are is provided with an inclined part a thickness of which becomes gradually greater in a rotating direction of the rotating element.

As the double wrap brake band according to the preferred embodiment of the present invention practically has the same basic construction as the conventional double wrap brake band described above, a description will hereinafter be made about essential features of the present invention. These essential features will be described with reference to FIGS. 3 and 4.

Figure 1:
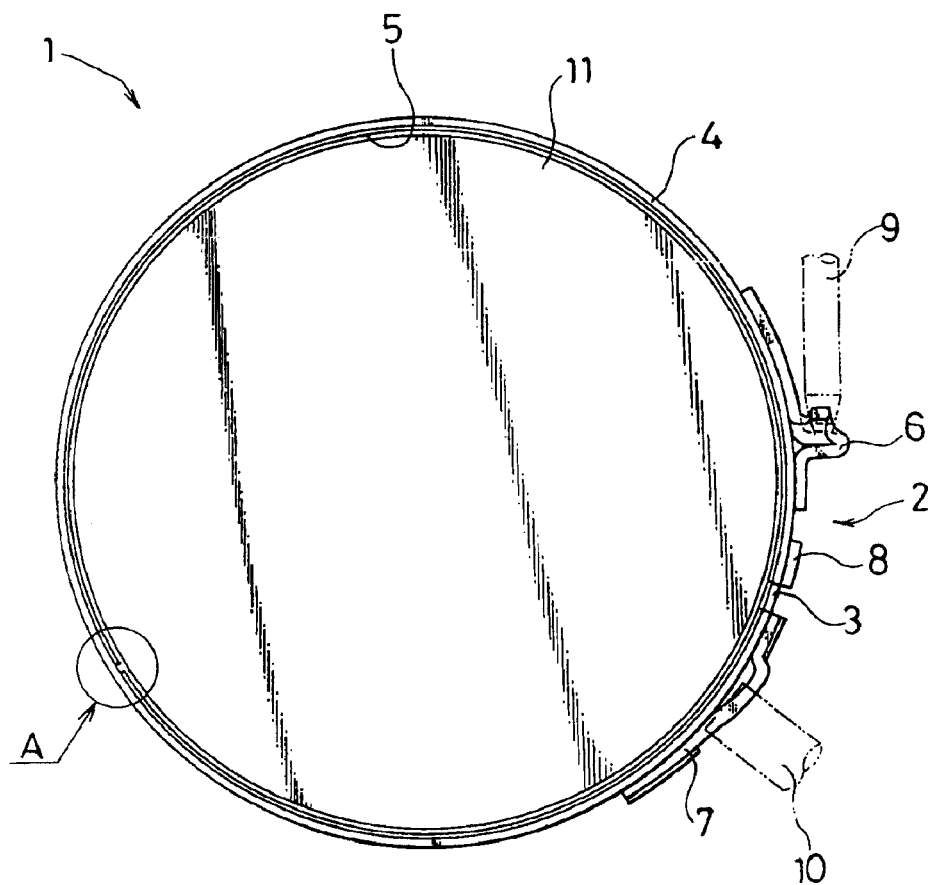
FIG. 1 is a front view of a conventional double wrap brake band assembly.
Figure 2:
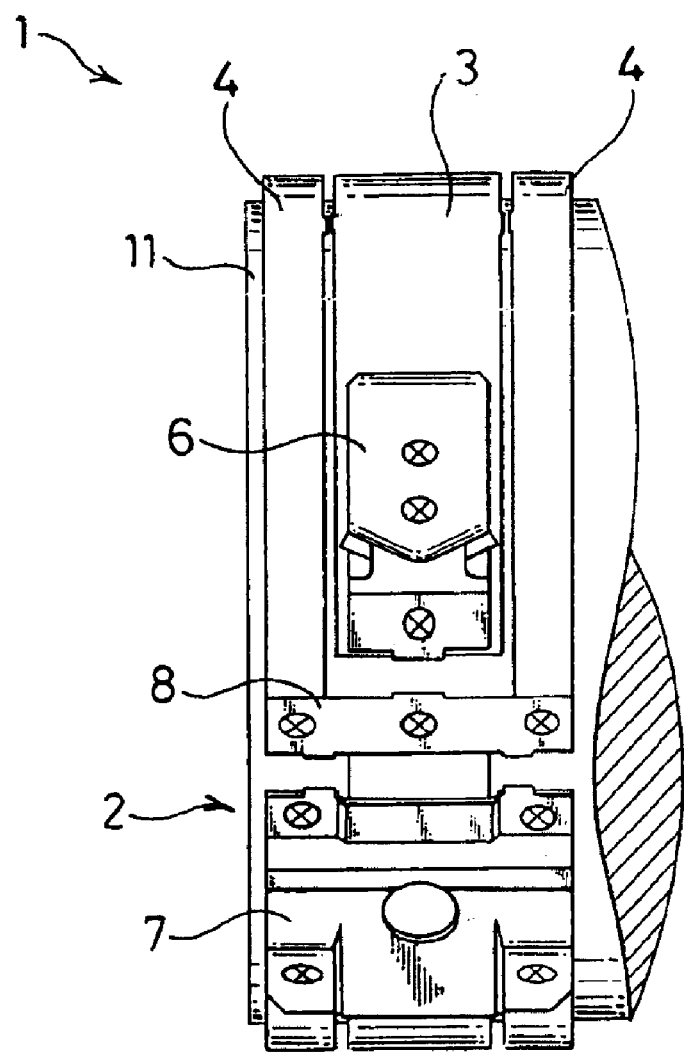
FIG. 2 is a side view of the conventional double wrap brake band assembly shown in FIG. 1.
Figure 3:
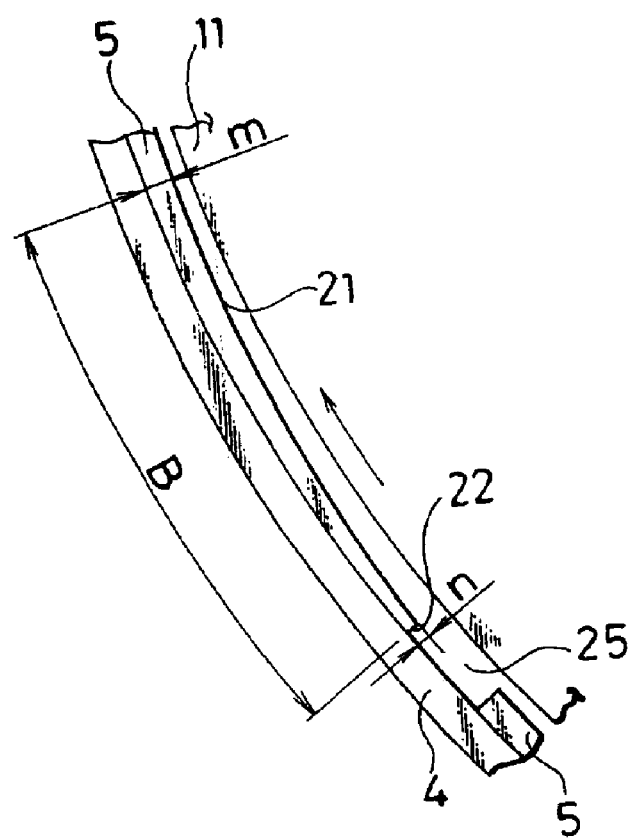
FIG. 3 is an enlarged side view of a section of a double wrap brake band according to a preferred embodiment of the present invention, said section corresponding to an encircled section indicated by letter A in FIG. 1.
Figure 4:
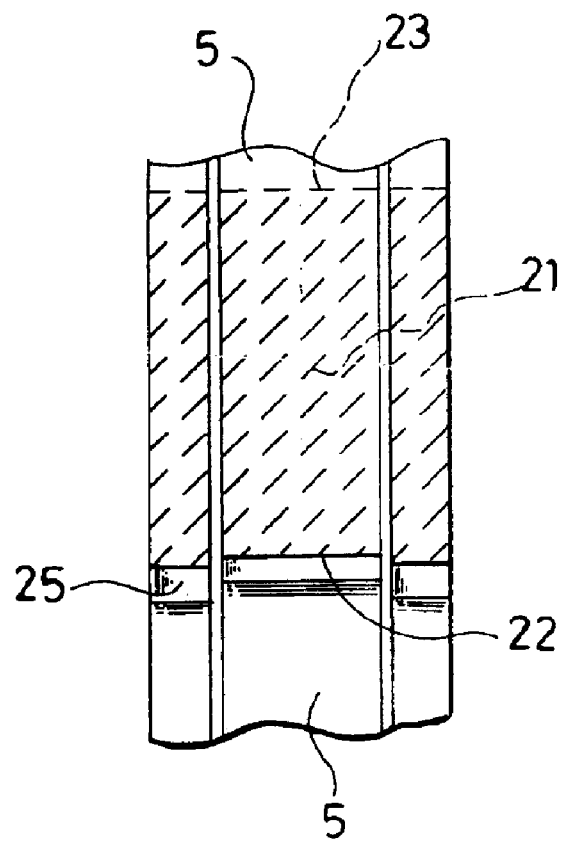
FIG. 4 is a development of the section of the double wrap brake band according to the preferred embodiment of the present invention, said section corresponding to an encircled section indicated by letter A in FIG. 1.

On an inner circumferential surface of a double wrap brake band 2, plural pieces 5 of friction lining are bonded with predetermined angular intervals 25. Each piece 5 of friction lining is provided with an inclined portion 21 such that over a predetermined range B from its leading end relative to the rotational direction of an associated rotating drum 11, the thickness of the piece of friction lining gradually increases, in other words, the distance from the piece of friction lining to an outer circumferential surface of the rotating drum 11 gradually decreases. In FIG. 3, the arrow indicates the rotating direction of the rotating drum 11, letter n designates the thickness of the piece of friction lining at its leading end 22, and letter m indicates the thickness of the piece of friction lining at its trailing end. These n and m satisfy the following inequality: n<m. Incidentally, numeral 23 (see FIG. 4) indicates a boundary between the inclined portion 21 and its adjacent friction surface.

The above-described inclined portion 21 can be formed by pressing down the friction material with a press roller over the predetermined range B after the basic construction of the above-mentioned double wrap brake band 2 has been obtained. The object of the present invention is believed to be fully achieved provided that such inclined portions 21 are formed only at the pieces 5 of friction lining bonded on the middle band 3. It is, however, easier to concurrently form such inclined portions at the pieces of friction lining bonded on the outside bands 4 when the inclined portions 21 are formed on the middle band 3 by the above-described method.

When the rotating drum 11, which is under rotation, is bound by the inclined portions 21—an essential feature of the present invention—of the double wrap brake band 2, oil films are temporarily formed by the inclined portions 21, so that the pieces 5 of friction material are temporarily prevented from undergoing direct contact with the outer circumferential surface of the rotating drum 11. As the frictional coefficient and torque capacity are at lowered levels at this time, the rotating drum 11 is allowed to slide to a desired extent, in other words, the double wrap brake band 2 is allowed to have desired frictional property.

What is claimed is:

1. A wet double wrap brake band for use with a rotating element in an oil-wet environment, said double wrap brake band being provided with a friction surface on an inner circumferential surface of a band portion wrapped substantially double, wherein said friction surface is provided with an inclined part such that said friction surface becomes gradually closer to an associated outer circumferential surface of said rotating element in a rotating direction of said rotating element and a wedge of oil forms between the friction surface and the outer circumference of said rotating element as the element rotates, wherein said friction surface is bonded in a form divided in plural pieces in a circumferential direction, adjacent divided pieces having a predetermined interval formed therebetween, each divided piece is formed with a thickness thereof gradually increasing from a leading end of each of said divided pieces of said friction surface toward a trailing end relative to said rotational direction of said rotating element, and the thickness of the trailing end of each of said divided pieces is greater than the thickness of the leading end of the divided piece immediately adjacent in said rotational direction.

2. A wet double wrap brake band for use in an oil-wet environment provided with a double wrap band portion, a friction lining bonded on an inner circumferential surface of said band portion, and brackets secured on opposite free end portions of said band portion, respectively, said double wrap band portion being composed of a middle band as long as substantially a single wrap and outside bands as long as substantially a single wrap secured together at proximal end portions thereof, and said double wrap brake band being frictionally engageable with a rotating element located on an inner side of said double wrap brake band, wherein said friction lining is provided with an inclined part, a thickness of which becomes gradually greater in a rotating direction of said rotating element such that a wedge of oil forms between the friction surface and the outer circumference of said rotating element as the element rotates, wherein said friction lining is bonded in a form divided in plural pieces in a circumferential direction, adjacent divided pieces having a predetermined interval formed therebetween, each divided piece is formed with a thickness thereof gradually increasing from a leading end of each of said divided pieces of said friction surface toward a trailing end relative to said rotational direction of said rotating element, and the thickness of the trailing end of each of said divided pieces is greater than the thickness of the leading end of the divided piece immediately adjacent in said rotational direction.

* * * * *